Aug. 29, 1944.          B. C. COONS          2,356,977
FRUIT RESHAPING MECHANISM
Original Filed Aug. 26, 1940
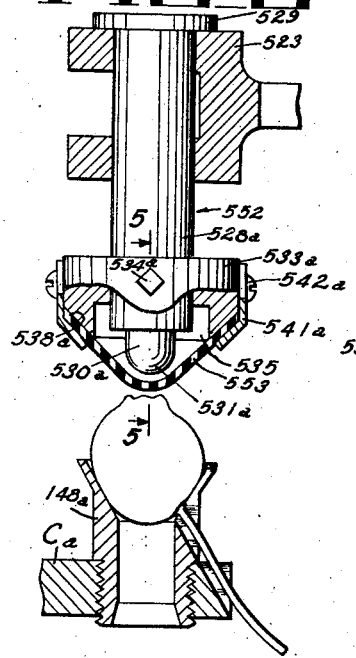
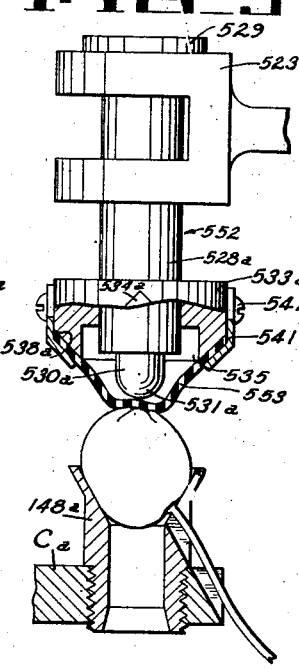
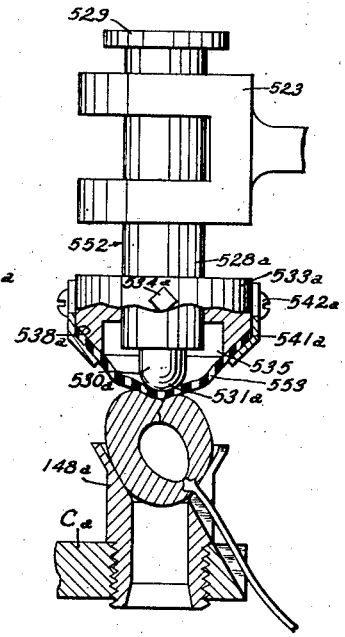
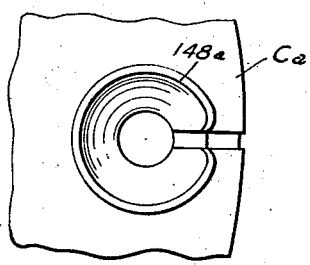
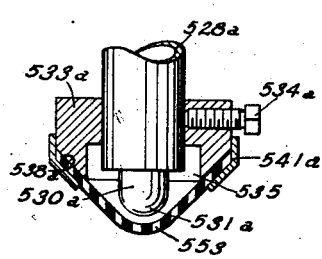
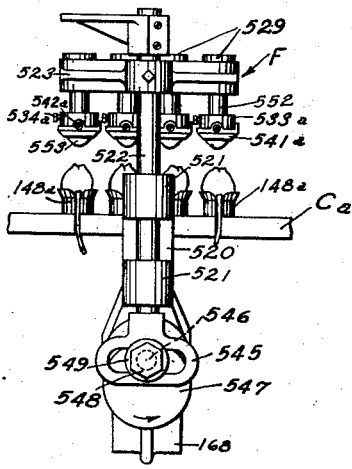
INVENTOR
BURTON C. COONS
BY Philip A. Minnis Patented Aug. 29, 1944

2,356,977

UNITED STATES PATENT OFFICE 2,356,977

FRUIT RESHAPING MECHANISM

Burton C. Coons, San Jose, Calif., assignor to Food Machinery Corporation, San Jose, Calif., a corporation of Delaware Original application August 26, 1940, Serial No. 354,240. Divided and this application November 16, 1942, Serial No. 465,765

8 Claims. (Cl. 146—19)

The present invention relates to a reshaping mechanism for reshaping pitted fruit, such as cherries, or the like.

This application is a division of my co-pending application, Serial No. 354,240, filed August 26, 1940, for Fruit handling machine.

One object of the present invention is to provide a simple reshaping mechanism for restoring the natural appearance of the fruit after pitting of the same.

Another object is to provide a reshaping mechanism for closing the wound of the fruit caused by the extraction of the pit.

A further object is to provide a reshaping mechanism for reshaping pitted cocktail cherries to close the wound left in the side of the fruit by the extraction of the pit and to restore the natural attractive appearance of the fruit.

Other and further objects and advantages of the present invention will become apparent from the following description taken in connection with the accompanying drawing in which:

Fig. 1 is an elevational view of the fruit reshaping mechanism of the present invention in conjunction with a portion of the turret and other parts of a cherry pitting machine.

Fig. 2 is an enlarged view partially in elevation and partially in section of a single reshaping tool of the reshaping mechanism and a portion of the turret shown in Fig. 1.

Fig. 3 is a view similar to Fig. 2 illustrating the action of a single reshaping tool upon a pitted cherry during the first part of the reshaping operation of the reshaping mechanism.

Fig. 4 is a view similar to Fig. 3 illustrating the action of the reshaping tool upon a pitted cherry during the final part of the reshaping operation of the reshaping mechanism.

Fig. 5 is a section of a portion of a reshaping tool taken along lines 5—5 of Fig. 2.

Fig. 6 is an enlarged plan view of a fruit holding cup and a portion of the turret shown in Fig. 1.

Referring now to the drawing and especially to Fig. 1 thereof, F indicates the reshaping mechanism of the present invention which is shown in association with an intermittently rotatable turret Ca and other parts of a cherry pitting machine of the type disclosed in my co-pending application, Serial No. 354,240, above referred to.

The reshaping mechanism F consists of a bracket 520, which is secured to a vertically extending frame portion 168 of a cherry pitting machine in a manner more specifically disclosed in my co-pending application. The bracket 520 is provided with vertical bearing portions 521 within which a vertical shaft 522 is slidably mounted. This shaft 522 carries a supporting bracket 523 within which a plurality of reshaping elements 552 are slidably mounted (see also Fig. 2). These reshaping elements 552 are so positioned with respect to the fruit holding cups 148a of the turret that they are in axial alignment therewith when the cups are in properly indexed position below the reshaping elements during the operation of the turret Ca of the pitting machine.

Each reshaping element 552 (see Fig. 2) consists of a cylindrical body portion 528a provided at its upper end with a flange 529 for retaining the element on the bracket 523. The lower end of the body portion 528a of each reshaping element is provided with a reshaping finger or tucker 530a of reduced diameter which has a dome shaped or semi-spherical end 531a.

Each reshaping element 552 comprises further a collar 533a adjustably attached to the body portion 528a by a set screw 534a. The collar 533a is recessed as shown at 535 and its lower end is formed into a frusto conical surface 538a to which a resiliently flexible conical diaphragm 553, preferably made of rubber, is attached. The diaphragm 553 is secured to the collar 533a by a retaining member 541a and screws 542a. The collar 533a is so positioned and adjusted with respect to the body portion 528a that the end 531a of the reshaping finger 530a is slightly spaced from the inner surface of the diaphragm 553 adjacent the apex thereof (see Fig. 2).

The reshaping elements 552 are, as already stated above, slidably mounted within the supporting bracket 523 and are normally held in their lowermost position as shown in Fig. 1 by their own weight so that the flange 529 of each reshaping element engages the upper surface of the bracket 523.

The hollow tubular body portion 528a of each reshaping element 552 is adapted to receive lead shot or the like, so that the weight of the reshaping element may be properly calibrated in accordance with the requirements of practice.

The lower end of the vertical shaft 522 carries a crank bearing 545 which receives a crank pin 546 of a crank disk 547 keyed to a shaft of the pitting machine and operated thereby in a manner more specifically disclosed in my co-pending application above referred to. The pin 546 is provided with a head 548 and a washer 549 for maintaining the crank bearing 545 in proper alignment therewith.

When the turret Ca is operated so as to move the fruit holding cups 148a and the pitted cherries positioned therein into alignment with the reshaping elements the same are above and out of contact with the pitted fruit, i. e., the cocktail cherries shown in Fig. 1. While the crank pin 546 which is continuously rotated by a shaft of the pitting machine travels through its upper arc during rotation of the crank 547, it causes an upward and subsequent downward movement of shaft 522, bracket 523 and reshaping elements 552. However, the reshaping elements remain above and out of contact with the fruit (see Fig. 1).

As soon as the indexing operation of the turret Ca of the pitting machine is completed and the fruit supporting cups 148a are at rest and in proper alignment with the reshaping elements 552, the crank pin 546 travels through its lower arc of rotation causing an additional downward movement and a subsequent upward movement of shaft 522, bracket 523 and reshaping elements 552.

During the downward movement of the reshaping mechanism in the manner above referred to each reshaping element 552 is brought into contact with the pitted fruit to be reshaped thereby so that the apex portion of the diaphragm 553 engages the dislocated skin and meat portions of the fruit in the region of the wound caused by the removal of the pit and flexes over the fruit in said region thereby folding the dislocated skin and meat portions back toward the fruit (see Fig. 3). Thereupon during continued downward movement of the bracket 523 the reshaping finger or tucker 530a contacts the inner surface of the diaphragm 553 adjacent the apex thereof and presses the same in a direction toward the center of the fruit (see Fig. 4) a sufficient distance so as to tuck the dislocated meat and skin portions back into the fruit and to press the same back into their original position thereby restoring the cherries to their natural and attractive appearance.

After completion of the reshaping action the crank pin 546 travels again to its upper arc of rotation, and the reshaping elements 552 are elevated above the reshaped fruit while the turret Ca is rotated by mechanism not shown herein so as to move the cups 148a away from the reshaping mechanism F and to bring another row of fruit holding cups into alignment with the reshaping mechanism in a manner as disclosed in my co-pending application, Serial Number 354,240 previously referred to herein.

The pressure exerted by the reshaping elements 552, i. e., the diaphragms 553 and reshaping fingers 530a must be maintained within predetermined limits so that the cherries are not damaged thereby. For this reason the reshaping elements 552 are freely movable in vertical directions within the supporting bracket 523 so that they may float individually in upward and downward directions. It is further to be noted that the weight of the reshaping elements is so calibrated that the pressure exerted thereupon the fruit is sufficient to tuck the dislocated meat portions back into the fruit and to reshape the same without damaging the fruit.

The free floating arrangement of the reshaping elements as above described permits an automatic individual adjustment of each reshaping element 552 with respect to the fruit reshaped thereby so that a predetermined pressure of each reshaping element 552 is maintained irrespective of the size of the fruit treated thereby. Crushing of large fruit which project farther above the fruit holding cups 148a is eliminated and likewise an insufficient reshaping operation upon small fruit due to lack of reshaping pressure is effectively prevented.

While the reshaping mechanism of the present invention is especially adapted for reshaping cocktail cherries the pit of which has been extracted through the side of the fruit, it is equally adaptable for reshaping cherries or similar fruit wherein the pit is removed through the meat portion at the stem cavity of the fruit.

While I have described a particular embodiment of the present invention it is to be understood however that various changes and modifications may be made without departing from the spirit of the present invention and the scope of the appended claims.

Having thus described my invention and in what manner the same may be used what I claim as new and desire to protect by Letters Patent is:

1. A reshaping mechanism for restoring the original appearance of pitted fruit comprising, flexible means for yieldingly engaging the fruit in the region of the wound left by the removal of the pit to move dislocated portions of the meat of the fruit toward their original positions, and means spaced from the flexible means and engageable with said flexible means when the latter yields upon engagement with the fruit for pressing said flexible means against said dislocated portions to force them to their original positions back into the fruit.

2. A reshaping mechanism for restoring the original appearance of pitted fruit comprising, resiliently flexible means, means for engaging the flexible means with the fruit and for flexing said means over dislocated meat portions of the fruit in the region of the wound left by the removal of the pit, and means substantially spaced from the flexible means and engageable with the latter adjacent said region upon flexing of the flexible means, for pressing said flexible means against the fruit to force the dislocated meat portions back into the fruit.

3. A reshaping mechanism for restoring the original appearance of pitted fruit comprising, a flexible diaphragm engageable with the displaced meat portions of the fruit in the region of the wound left by the removal of the pit to replace said displaced meat back over said wound, means for moving the flexible diaphragm into engagement with the displaced meat whereby to flex said diaphragm over said wound, and means spaced from the flexible diaphragm and engageable by said diaphragm when the latter is flexed over the wound, for pressing said diaphragm against the fruit to force the replaced meat portions back into the fruit and to restore the original appearance thereof.

4. A reshaping mechanism for restoring the original appearance of pitted fruit comprising, resiliently flexible means adapted to be brought into contact under slight pressure with the pitted fruit in the region of the wound left by the removal of the pit to fold dislocated meat portions engaged thereby back toward the fruit, and a rigid member for subsequently engaging the flexible means for exerting sufficient additional pressure upon the same to tuck the dislocated meat portions back into the fruit.

5. A reshaping mechanism for restoring the original appearance of pitted fruit comprising, a conical resiliently flexible diaphragm having an apex portion adapted to be brought into contact with the fruit in the region of the wound left by the removal of the pit under sufficient pressure to flex the apex portion of the diaphragm over a portion of the fruit and to fold dislocated meat portions thereof back upon the fruit, and means for exerting additional pressure upon the apex portion of the diaphragm to tuck the dislocated meat portions engaged by the same back into the fruit.

6. A reshaping mechanism for restoring the original appearance of pitted fruit comprising, a conical resiliently flexible diaphragm having an apex portion adapted to be brought into contact with the pitted fruit in the region of the wound left by the removal of the pit under sufficient pressure to flex the apex portion of the diaphragm over a portion of the fruit and to fold dislocated meat portions of the fruit back toward the same, and a presser finger having a semicircular face adapted to engage the interior surface of the apex portion of the diaphragm for exerting additional pressure upon the apex portion of the diaphragm to force the dislocated meat portions engaged by the diaphragm back into the fruit.

7. A reshaping mechanism for restoring the original appearance of pitted fruit comprising, flexible means engageable with the pitted fruit for engaging dislocated meat portions of the same in the region of the wound left by the removal of the pit, and means relatively movable with respect to said flexible means and engageable with the diaphragm for pressing the meat portions engaged thereby back into their original positions.

8. A reshaping mechanism for restoring the original appearance of pitted fruit comprising, a reshaping element including a conical resiliently flexible diaphragm and a presser finger centrally positioned adjacent the interior surface of the apex portion of the diaphragm, and means for operating said reshaping element for engaging the apex portion of the diaphragm with the pitted fruit in the region of the wound left by the removal of the pit, for flexing the apex portion over the fruit to contact the dislocated meat portions of the fruit and for engaging the presser finger with the interior surface of the diaphagm at the apex portion thereof to exert sufficient pressure upon the same to press the contacted dislocated meat portions back into the fruit.

BURTON C. COONS.